United States Patent
Murata

(10) Patent No.: US 11,624,732 B2
(45) Date of Patent: Apr. 11, 2023

(54) DETECTION DEVICE AND DIAGNOSTIC SYSTEM

(71) Applicant: KELK Ltd., Kanagawa (JP)

(72) Inventor: Tomonori Murata, Kanagawa (JP)

(73) Assignee: KELK Ltd., Kanagawa (JP)

(*) Notice: Subject to any disclaimer, the term of this patent is extended or adjusted under 35 U.S.C. 154(b) by 56 days.

(21) Appl. No.: 17/238,547

(22) Filed: Apr. 23, 2021

(65) Prior Publication Data
US 2021/0333243 A1    Oct. 28, 2021

(30) Foreign Application Priority Data
Apr. 28, 2020  (JP) .............. JP2020-079857

(51) Int. Cl.
*G01N 29/46* (2006.01)
*G01N 29/14* (2006.01)

(52) U.S. Cl.
CPC ............ *G01N 29/46* (2013.01); *G01N 29/14* (2013.01); *G01N 2291/014* (2013.01)

(58) Field of Classification Search
CPC .... G01N 29/46; G01N 29/14; G01N 29/2431; G01N 2291/014; G01N 2291/0258; G01N 2291/2696
See application file for complete search history.

(56) References Cited

U.S. PATENT DOCUMENTS

| | | | |
|---|---|---|---|
| 5,424,749 A * | 6/1995 | Richmond | ............. F41H 13/00 342/194 |
| 8,214,104 B2 | 7/2012 | Ohta et al. | |
| 2015/0256944 A1* | 9/2015 | Inagaki | ................. G01H 17/00 381/60 |

FOREIGN PATENT DOCUMENTS

JP    2008267870    11/2008

* cited by examiner

*Primary Examiner* — Suman K Nath
(74) *Attorney, Agent, or Firm* — Fish & Richardson P.C.

(57) ABSTRACT

A detection device includes a vibration sensor configured to detect vibration of a machine, a calculation unit configured to perform FFT analysis on detection data of the vibration sensor, divide a specific frequency range into a plurality of frequency ranges, and calculate a partial overall value for each of the plurality of frequency ranges, and a wireless communication device configured to transmit the partial overall value.

15 Claims, 6 Drawing Sheets

<NORMAL STATE>

<ABNORMAL STATE>

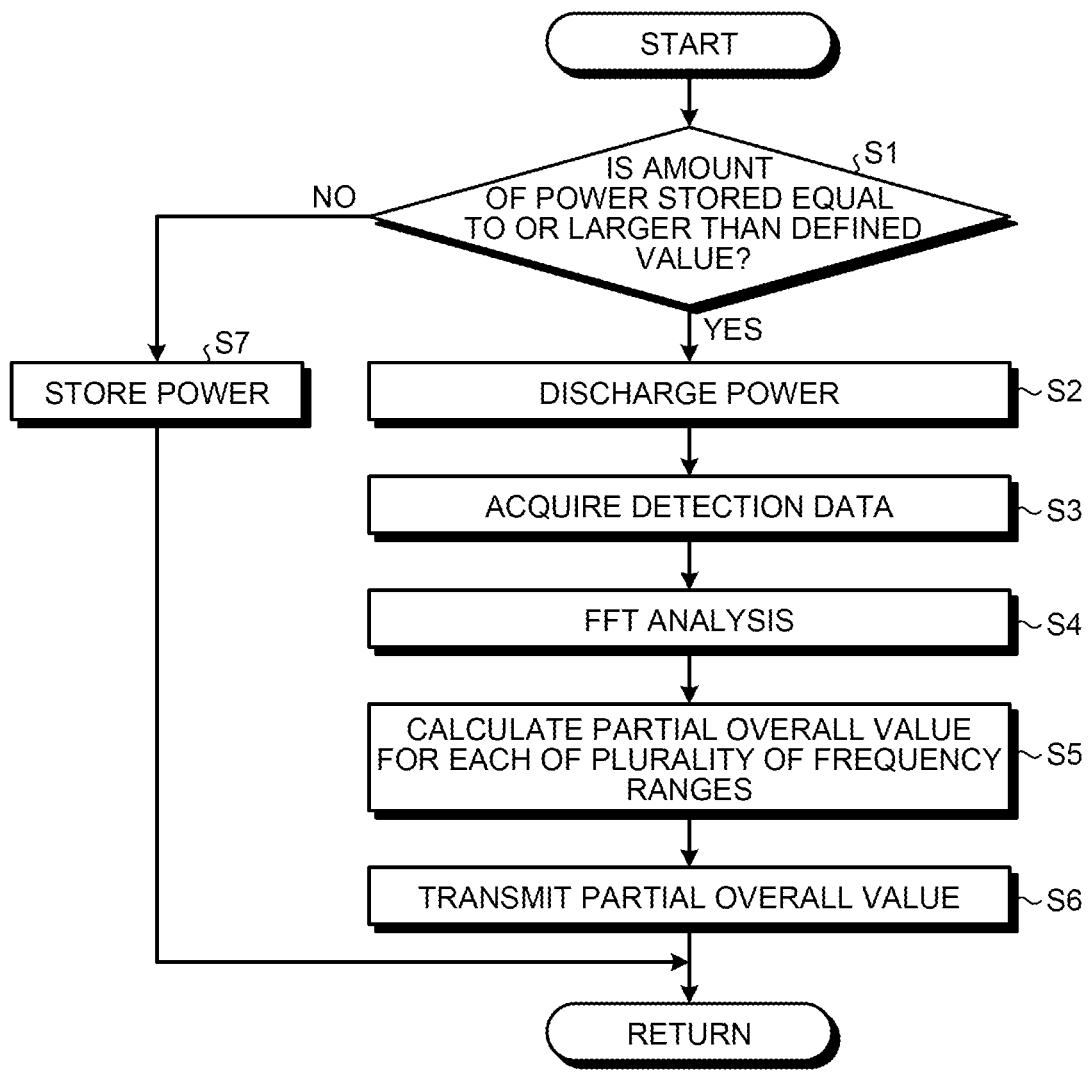

DETECTION DEVICE AND DIAGNOSTIC SYSTEM

CROSS-REFERENCE TO RELATED APPLICATION(S)

The present application claims priority to and incorporates by reference the entire contents of Japanese Patent Application No. 2020-079857, filed in Japan on Apr. 28, 2020.

BACKGROUND OF THE INVENTION

1. Field of the Invention

The present disclosure relates to a detection device and a diagnostic system.

2. Description of the Related Art

For the diagnosis of a device, a technology is known to detect a vibration generated during the operation of the device, with a vibration sensor. JP 2008-267870 A discloses a technology for estimating whether abnormal noise is generated in a vehicle vibration isolator, on the basis of a partial overall value for a specific range including the frequency of the abnormal noise generated in a vehicle interior.

In conventional art, the partial overall value is calculated for a partial range of frequencies detected by the vibration sensor. In calculation of the partial overall value for partial range, there is a possibility that it is difficult to properly diagnose a device in some cases.

An object of the present disclosure is to properly diagnose a device.

SUMMARY OF THE INVENTION

According to an aspect of the present invention, a detection device comprises: a vibration sensor configured to detect vibration of a machine; a calculation unit configured to perform FFT analysis on detection data of the vibration sensor, divide a specific frequency range into a plurality of frequency ranges, and calculate a partial overall value for each of the plurality of frequency ranges; and a wireless communication device configured to transmit the partial overall value.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 7 is a flowchart illustrating a diagnosis method according to the embodiment.

DETAILED DESCRIPTION OF THE PREFERRED EMBODIMENTS

Embodiments according to the present disclosure will be described below with reference to the drawings, but the present disclosure is not limited to the description. Component elements according to the embodiments described below may be appropriately combined with each other. Furthermore, some of the component elements are not used in some cases.

In the embodiments, an XYZ orthogonal coordinate system is set, and positional relationships between functional units will be described with reference to the XYZ orthogonal coordinate system. A direction parallel to an X-axis in a predetermined plane is represented as an X-axis direction, a direction parallel to a Y-axis orthogonal to the X-axis in the predetermined plane is represented as a Y-axis direction, and a direction parallel to a Z-axis orthogonal to the predetermined plane is represented as a Z-axis direction. An XY plane, including the X- and Y-axes, is parallel to the predetermined plane.

Detection Device

Figure 1:
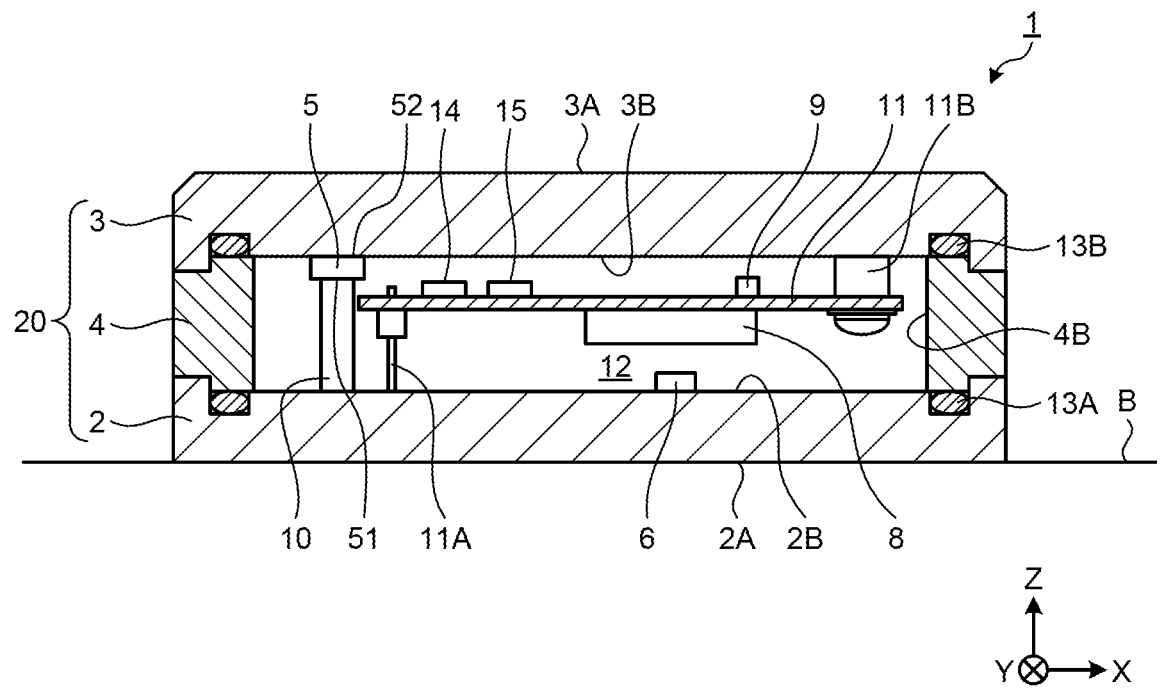
FIG. 1 is a cross-sectional view schematically illustrating a detection device according to an embodiment.

FIG. 1 is a cross-sectional view schematically illustrating a detection device 1 according to an embodiment. The detection device 1 is installed on a machine B. The machine B is provided in an industrial facility such as a factory. As the machine B, a rotary machine is exemplified. As the rotary machine, a motor that operates a pump is exemplified.

As illustrated in FIG. 1, the detection device 1 includes a heat reception portion 2, a heat release portion 3, a peripheral wall portion 4, a thermoelectric generation module 5, a switching unit 14, a power storage unit 15, a vibration sensor 6, a microcomputer 8, a wireless communication device 9, a heat transfer member 10, and a circuit board 11.

The heat reception portion 2 is installed on the machine B. The heat reception portion 2 is a plate-shaped member. The heat reception portion 2 is formed of a metal material such as aluminum or copper. The heat reception portion 2 receives heat from the machine B. The heat of the heat reception portion 2 is transferred to the thermoelectric generation module 5 via the heat transfer member 10.

The heat release portion 3 is opposed to the heat reception portion 2 with a space therebetween. The heat release portion 3 is a plate-shaped member. The heat release portion 3 is formed of a metal material such as aluminum or copper. The heat release portion 3 receives heat from the thermoelectric generation module 5. The heat of the heat release portion 3 is released into ambient air around the detection device 1.

The heat reception portion 2 has a heat reception surface 2A that is opposed to a surface of the machine B and an inside surface 2B that faces in a direction opposite to the heat reception surface 2A. The heat reception surface 2A faces in a −Z direction. The inside surface 2B faces in a +Z direction. Each of the heat reception surface 2A and the inside surface 2B has a flat shape. Each of the heat reception surface 2A and the inside surface 2B is parallel to the XY plane. In the XY plane, the heat reception portion 2 has substantially a square outer shape. Note that the heat reception portion 2 may not have the square outer shape. The heat reception portion 2 may have a circular, elliptical, or any polygonal outer shape.

The heat release portion 3 has a heat release surface 3A that faces the ambient air and an inside surface 3B that faces in a direction opposite to the heat release surface 3A. The heat release surface 3A faces in the +Z direction. The inside surface 3B faces in the −Z direction. Each of the heat release surface 3A and the inside surface 3B has a flat shape. Each of the heat release surface 3A and the inside surface 3B is parallel to the XY plane. In the XY plane, the heat release portion 3 has substantially a square outer shape. Note that the heat release portion 3 may not have the square outer shape. The heat release portion 3 may have a circular, elliptical, or any polygonal outer shape.

In the XY plane, the heat reception portion 2 and the heat release portion 3 are substantially equal in shape and size. Note that the shape and size of the heat reception portion 2 and the shape and size of the heat release portion 3 may be different from each other.

The peripheral wall portion 4 is arranged between the peripheral edge portion of the inside surface 2B of the heat reception portion 2 and the peripheral edge portion of the inside surface 3B of the heat release portion 3. The peripheral wall portion 4 connects the heat reception portion 2 and the heat release portion 3. The peripheral wall portion 4 is formed of a synthetic resin.

In the XY plane, the peripheral wall portion 4 has an annular shape. In the XY plane, the peripheral wall portion 4 has substantially a square outer shape. The heat reception portion 2, the heat release portion 3, and the peripheral wall portion 4 define an inner space 12 of the detection device 1. The peripheral wall portion 4 has an inside surface 4B that faces the inner space 12. The inside surface 2B of the heat reception portion 2 faces the inner space 12. The inside surface 3B of the heat release portion 3 faces the inner space 12. The outer space of the detection device 1 is the ambient air around the detection device 1.

The heat reception portion 2, the heat release portion 3, and the peripheral wall portion 4 function as a housing of the detection device 1 that defines the inner space 12. In the following description, the heat reception portion 2, the heat release portion 3, and the peripheral wall portion 4 are appropriately referred to as a housing 20 collectively.

A sealing member 13A is arranged between the peripheral edge portion of the inside surface 2B of the heat reception portion 2 and an end surface on the −Z side of the peripheral wall portion 4. A sealing member 13B is arranged between the peripheral edge portion of the inside surface 3B of the heat release portion 3 and an end surface on the +Z side of the peripheral wall portion 4. Each of the sealing member 13A and the sealing member 13B includes, for example, an O-ring. The sealing member 13A is arranged in a recess provided in the peripheral edge portion of the inside surface 2B. The sealing member 13B is arranged in a recess provided in the peripheral edge portion of the inside surface 3B. The sealing member 13A and the sealing member 13B inhibit foreign matter in the outer space of the detection device 1 from entering the inner space 12.

The thermoelectric generation module 5 uses the Seebeck effect to generate power. The machine B functions as a heat source for the thermoelectric generation module 5. The thermoelectric generation module 5 is arranged between the heat reception portion 2 and the heat release portion 3. An end surface 51 on the −Z side of the thermoelectric generation module 5 is heated, a temperature difference is applied between the end surface 51 on the −Z side and an end surface 52 on the +Z side of the thermoelectric generation module 5, and thereby the thermoelectric generation module 5 generates power.

The end surface 51 faces in the −Z direction. The end surface 52 faces in the +Z direction. Each of the end surface 51 and the end surface 52 has a flat shape. Each of the end surface 51 and the end surface 52 is parallel to the XY plane. In the XY plane, the thermoelectric generation module 5 has substantially a square outer shape.

The end surface 52 is opposed to the inside surface 3B of the heat release portion 3. The thermoelectric generation module 5 is fixed to the heat release portion 3. The heat release portion 3 and the thermoelectric generation module 5 are bonded to each other, for example, by adhesive.

Note that in the example illustrated in FIG. 1, the thermoelectric generation module 5 is in contact with the heat release portion 3 but may be in contact with the heat reception portion 2.

The power storage unit 15 stores power generated by the thermoelectric generation module 5. As the power storage unit 15, a capacitor or a secondary battery is exemplified.

The switching unit 14 operates to switch between a power storage state in which power generated by the thermoelectric generation module 5 is supplied to the power storage unit 15, and a power supply state in which power stored in the power storage unit 15 is supplied to each of the vibration sensor 6, the microcomputer 8, and the wireless communication device 9. As the switching unit 14, a DC/DC converter is exemplified.

The vibration sensor 6 detects the vibration of the machine B. The vibration sensor 6 is driven by power generated by the thermoelectric generation module 5. The vibration sensor 6 is arranged in the inner space 12. In the embodiment, the vibration sensor 6 is supported on the inside surface 2B of the heat reception portion 2.

As the vibration sensor 6, an acceleration sensor is exemplified. Note that the vibration sensor 6 may be a speed sensor or a displacement sensor. In the embodiment, the vibration sensor 6 is configured to detect the vibration of the machine B in three directions of the X-axis direction, Y-axis direction, and Z-axis direction.

The microcomputer 8 controls the detection device 1. The microcomputer 8 is driven by power generated by the thermoelectric generation module 5. The microcomputer 8 is arranged in the inner space 12. In the embodiment, the microcomputer 8 is supported on the circuit board 11.

The wireless communication device 9 communicates with a management computer 100 being outside the detection device 1. The wireless communication device 9 is driven by power generated by the thermoelectric generation module 5. The wireless communication device 9 is arranged in the inner space 12. In the embodiment, the wireless communication device 9 is supported on the circuit board 11.

The heat transfer member 10 connects the heat reception portion 2 and the thermoelectric generation module 5. The heat transfer member 10 transfers the heat of the heat reception portion 2 to the thermoelectric generation module 5. The heat transfer member 10 is formed of a metal material such as aluminum or copper. The heat transfer member 10 is a rod-shaped member elongated in the Z-axis direction. The heat transfer member 10 is arranged in the inner space 12.

The circuit board 11 includes a control circuit board. The circuit board 11 is arranged in the inner space 12. The circuit board 11 is connected to the heat reception portion 2 via a support member 11A. The circuit board 11 is connected to the heat release portion 3 via a support member 11B. The circuit board 11 is supported by the support member 11A and the support member 11B so as to be separated from each of the heat reception portion 2 and the heat release portion 3.

Thermoelectric Generation Module

Figure 2:
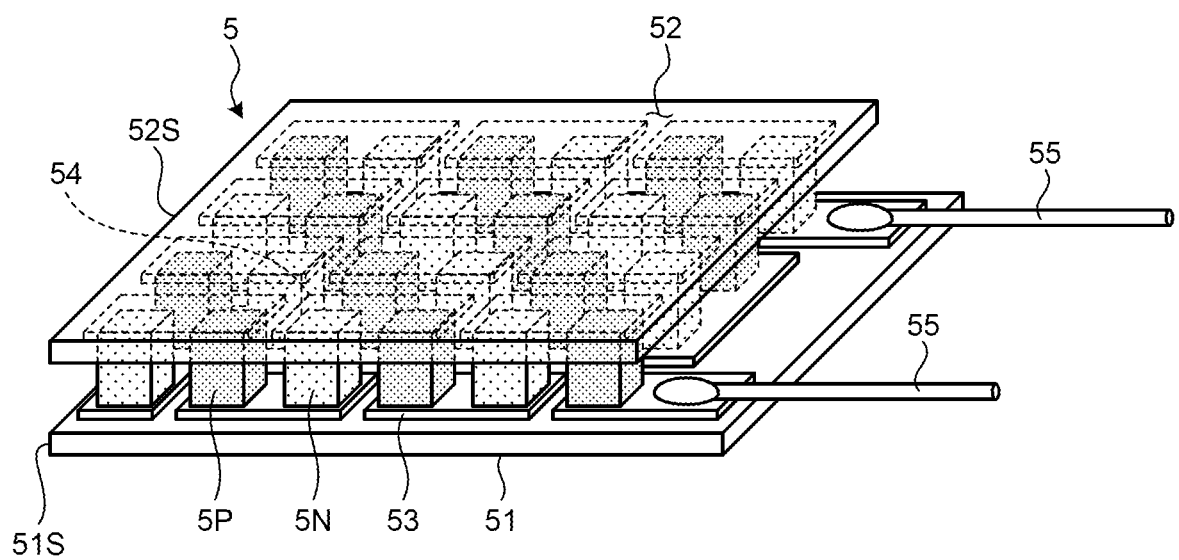
FIG. 2 is a perspective view schematically illustrating a thermoelectric generation module according to the embodiment.

FIG. 2 is a perspective view schematically illustrating the thermoelectric generation module 5 according to the embodiment. The thermoelectric generation module 5 has p-type thermoelectric semiconductor devices 5P, n-type thermoelectric semiconductor devices 5N, first electrodes 53, second electrodes 54, a first substrate 51S, and a second substrate 52S. In the XY plane, the p-type thermoelectric semiconductor devices 5P and the n-type thermoelectric semiconductor devices 5N are arranged alternately. Each of the first electrodes 53 is connected to each of the p-type thermoelectric semiconductor devices 5P and n-type thermoelectric semiconductor devices 5N. Each of the second electrodes 54 is connected to each of the p-type thermoelectric semiconductor devices 5P and n-type thermoelectric semiconductor devices 5N. A lower surface of the p-type thermoelectric semiconductor device 5P and a lower surface of the n-type thermoelectric semiconductor device 5N are connected to the first electrode 53. An upper surface of the p-type thermoelectric semiconductor device 5P and an upper surface of the n-type thermoelectric semiconductor device 5N are connected to the second electrode 54. The first electrode 53 is connected to the first substrate 51S. The second electrode 54 is connected to the second substrate 52S.

Each of the p-type thermoelectric semiconductor device 5P and n-type thermoelectric semiconductor device 5N includes, for example, a BiTe-based thermoelectric material. Each of the first substrate 51S and second substrate 52S is formed of an electrical insulating material such as ceramics or polyimide.

The first substrate 51S has the end surface 51. The second substrate 52S has the end surface 52. In response to heating the first substrate 51S, a temperature difference is applied between end portions on the +Z side and −Z side of each p-type thermoelectric semiconductor device 5P and n-type thermoelectric semiconductor device 5N. In response to applying the temperature difference between the end portions on the +Z side and −Z side of the p-type thermoelectric semiconductor device 5P, holes move in the p-type thermoelectric semiconductor device 5P. In response to applying the temperature difference between the end portions on the +Z side and −Z side of the n-type thermoelectric semiconductor device 5N, electrons move in the n-type thermoelectric semiconductor device 5N. The p-type thermoelectric semiconductor device 5P and the n-type thermoelectric semiconductor device 5N are connected via the first electrode 53 and the second electrode 54. A potential difference is generated between the first electrode 53 and the second electrode 54 due to holes and electrons. The thermoelectric generation module 5 generates power due to the potential difference between the first electrode 53 and the second electrode 54. A lead wire 55 is connected to the first electrode 53. The thermoelectric generation module 5 outputs power via the lead wire 55.

Diagnostic System

Figure 3:
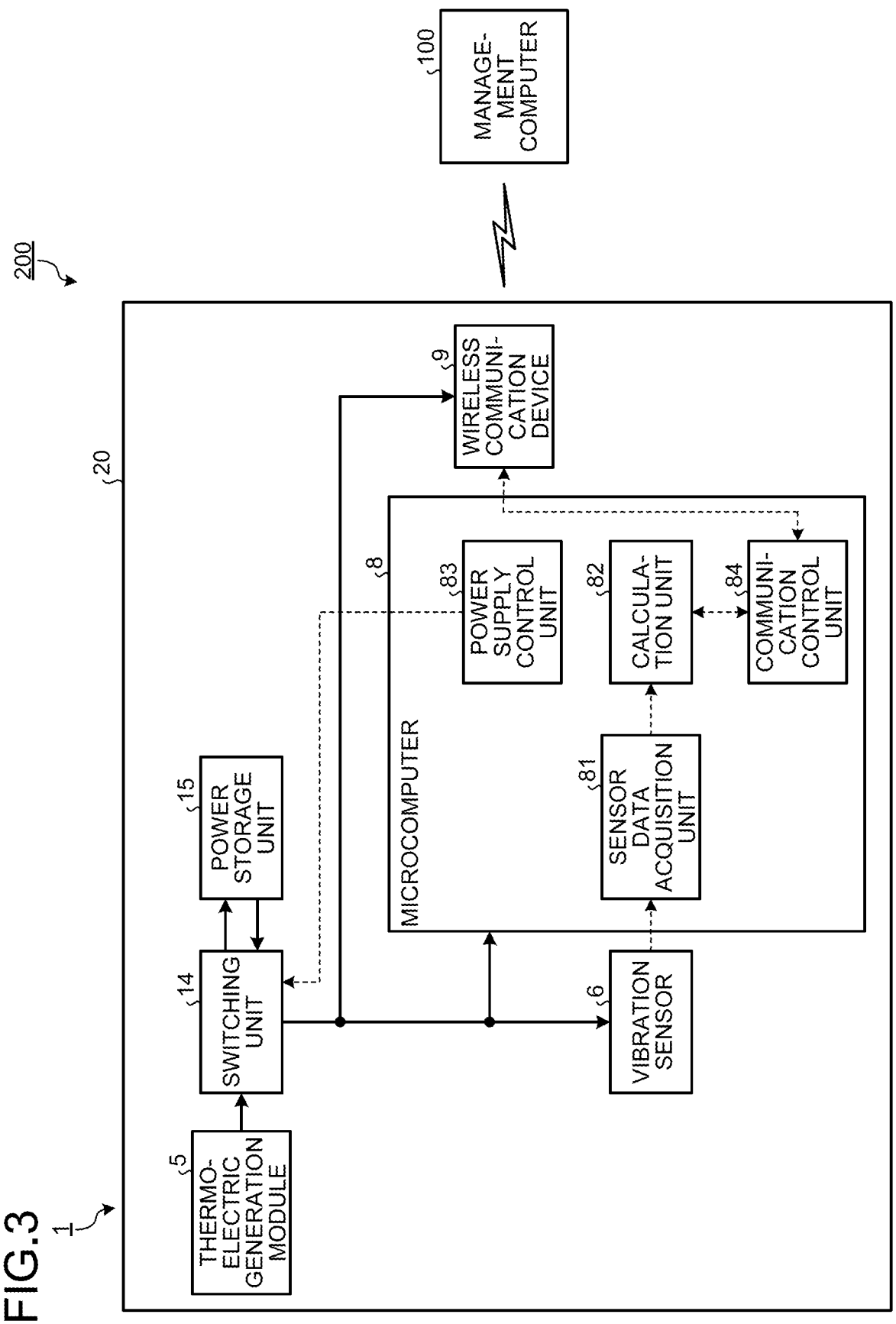
FIG. 3 is a block diagram illustrating a diagnostic system according to the embodiment.

FIG. 3 is a block diagram illustrating a diagnostic system 200 according to the embodiment. The diagnostic system 200 includes the detection device 1 and the management computer 100 that is outside the detection device 1. The detection device 1 has the thermoelectric generation module 5, the switching unit 14, the power storage unit 15, the vibration sensor 6, the microcomputer 8, and the wireless communication device 9. The thermoelectric generation module 5, the switching unit 14, the power storage unit 15, the vibration sensor 6, the microcomputer 8, and the wireless communication device 9 are housed in one housing 20.

The microcomputer 8 has a sensor data acquisition unit 81, a calculation unit 82, a power supply control unit 83, and a communication control unit 84.

The sensor data acquisition unit 81 acquires detection data of the vibration sensor 6. The detection data of the vibration sensor 6 includes a vibration waveform.

The calculation unit 82 performs arithmetic processing on the basis of the detection data of the vibration sensor 6 acquired by the sensor data acquisition unit 81. In the embodiment, the calculation unit 82 processes the detection data of the vibration sensor 6 using a fast Fourier transform (FFT) analysis, divides a specific range of frequencies in a spectrum obtained by the FFT analysis into a plurality of frequency ranges, and calculates a partial overall value for each of the plurality of frequency ranges. In the embodiment, the calculation unit 82 divides the entire range of the frequencies of vibration detected by the vibration sensor 6 into a plurality of frequency ranges, and calculates a partial overall value for each of the plurality of frequency ranges.

In the embodiment, the calculation unit 82 is configured to calculate an overall value of the detection data of the vibration sensor 6. The calculation unit 82 is configured to calculate an overall value of the entire range of the vibration waveform detected by the vibration sensor 6.

The overall value represents the sum of power spectra in the entire range of frequencies that are targets for the fast Fourier transform (FFT) analysis. The partial overall value represents an overall value in a limited frequency range for which the sum of power spectra is to be calculated.

In the embodiment, the calculation unit 82 is configured to calculate an effective value (root mean square value: RMS) of the detection data of the vibration sensor 6. Furthermore, the calculation unit 82 is configured to divide the entire range of the vibration waveform detected by the vibration sensor 6 into a plurality of frequency ranges to calculate an effective value for each of the plurality of frequency ranges. The effective value of vibration may be an effective value of acceleration, an effective value of velocity, or an effective value of displacement.

Note that the calculation unit 82 may calculate a peak value of the detection data of the vibration sensor 6. The peak value of vibration includes a maximum value and a minimum value of the vibration. The peak value of vibration may be a peak value in the entire range of the vibration waveform or may be a peak value in each of a plurality of frequency ranges of the vibration waveform. The peak value of vibration may be a peak value of acceleration, a peak value of velocity, or a peak value of displacement.

The power supply control unit 83 controls the switching unit 14 to switch between the power supply state and the power storage state. The power supply control unit 83 monitors the amount of power stored in the power storage unit 15 and controls the switching unit 14 to switch from the power storage state to the power supply state, when the amount of power stored in the power storage unit 15 reaches a defined value.

The voltage of power generated by the thermoelectric generation module 5 is increased by a boosting unit (not illustrated) and then supplied to the switching unit 14. In a case where the amount of power stored in the power storage unit 15 does not reach the defined value, the power supply control unit 83 controls the switching unit 14 to supply power generated by the thermoelectric generation module 5 to the power storage unit 15. The power storage unit 15 stores power generated by the thermoelectric generation module 5.

In a case where the amount of power stored in the power storage unit 15 is equal to or larger than the defined value, the power is discharged from the power storage unit 15. The power supply control unit 83 controls the switching unit 14 to supply the power discharged from the power storage unit 15 to each of the vibration sensor 6, the microcomputer 8, and the wireless communication device 9. Each of the vibration sensor 6, the microcomputer 8, and the wireless communication device 9 consumes the power supplied from the power storage unit 15.

After the power is discharged from the power storage unit 15, the switching unit 14 is controlled to supply power generated by the power supply control unit 83 and the thermoelectric generation module 5 to the power storage unit 15. The power storage unit 15 stores the power generated by the thermoelectric generation module 5 again.

In a case where the amount of power stored in the power storage unit 15 is equal to or larger than the defined value, the power is discharged from the power storage unit 15. The power supply control unit 83 controls the switching unit 14 to supply the power discharged from the power storage unit 15 to each of the vibration sensor 6, the microcomputer 8, and the wireless communication device 9 again. Each of the vibration sensor 6, the microcomputer 8, and the wireless communication device 9 consumes the power supplied from the power storage unit 15.

In this way, the power storage state in which power generated by the thermoelectric generation module 5 is supplied to the power storage unit 15 and the power supply state in which power stored in the power storage unit 15 is supplied to each of the vibration sensor 6, the microcomputer 8, and the wireless communication device 9 are repeated. Power is stored in the power storage unit 15 intermittently. Power is supplied intermittently to each of the vibration sensor 6, the microcomputer 8, and the wireless communication device 9.

The communication control unit 84 controls the wireless communication device 9 to transmit a plurality of partial overall values calculated by the calculation unit 82 to the management computer 100. The wireless communication device 9 transmits the plurality of partial overall values calculated by the calculation unit 82 to the management computer 100.

In the embodiment, when the overall value, the effective value, or the peak value is calculated by the calculation unit 82, the communication control unit 84 controls the wireless communication device 9 to transmit the overall value, the effective value, or the peak value to the management computer 100. The wireless communication device 9 transmits the overall value, the effective value, or the peak value calculated by the calculation unit 82 to the management computer 100.

The management computer 100 receives the partial overall values transmitted from the detection device 1 and diagnoses the presence or absence of an abnormality in the machine B.

Operation

Figure 4A:
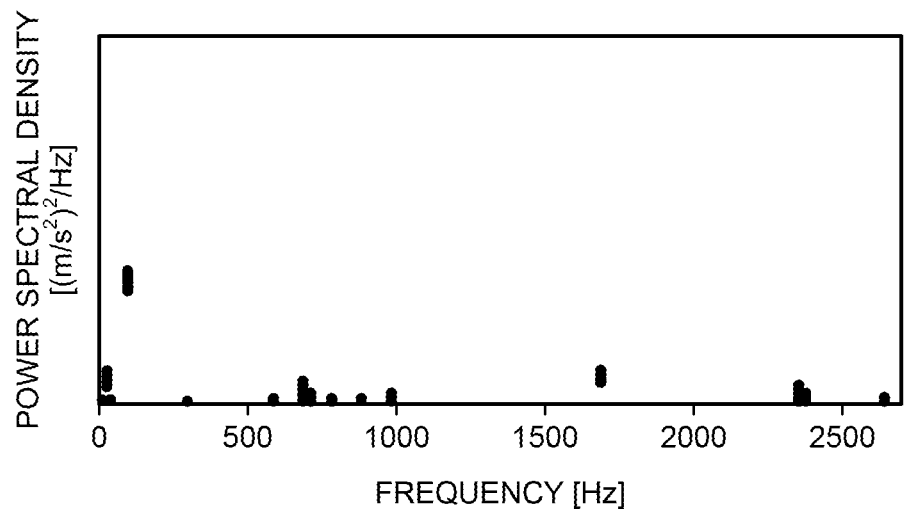
FIGS. 4A and 4B are graphs each illustrating detection data of a vibration sensor according to the embodiment.
Figure 4B:
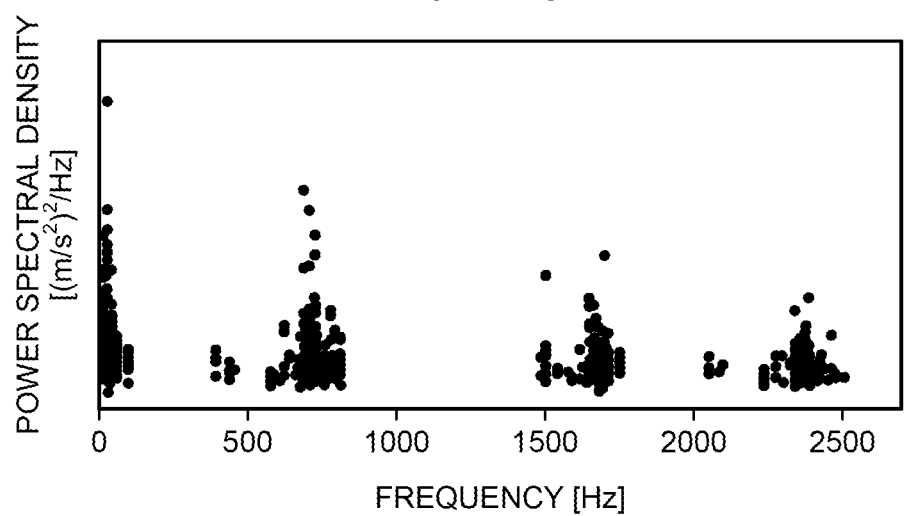
Figure 5A:
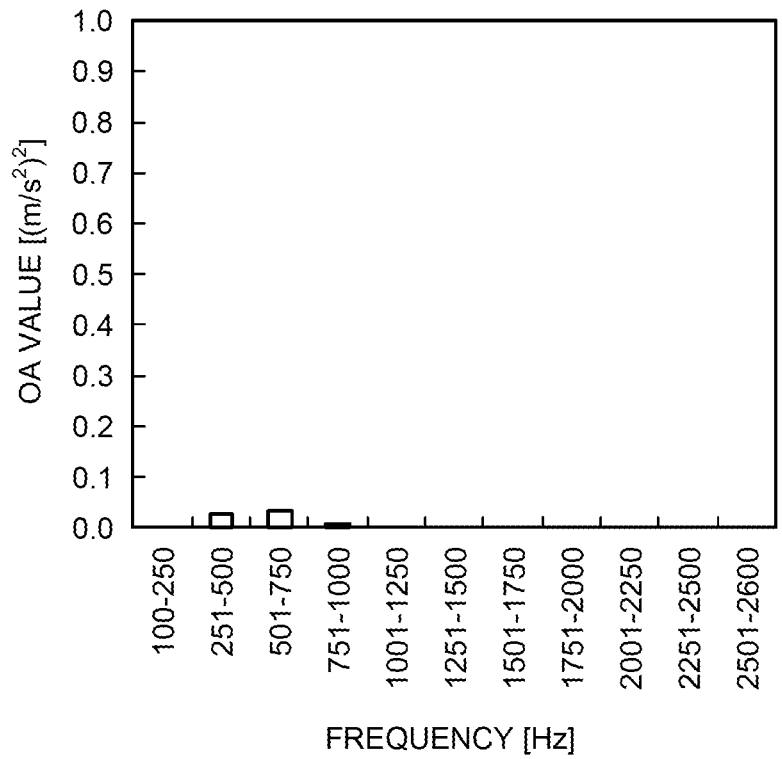
FIGS. 5A and 5B are graphs each illustrating partial overall values according to the embodiment.
Figure 5B:
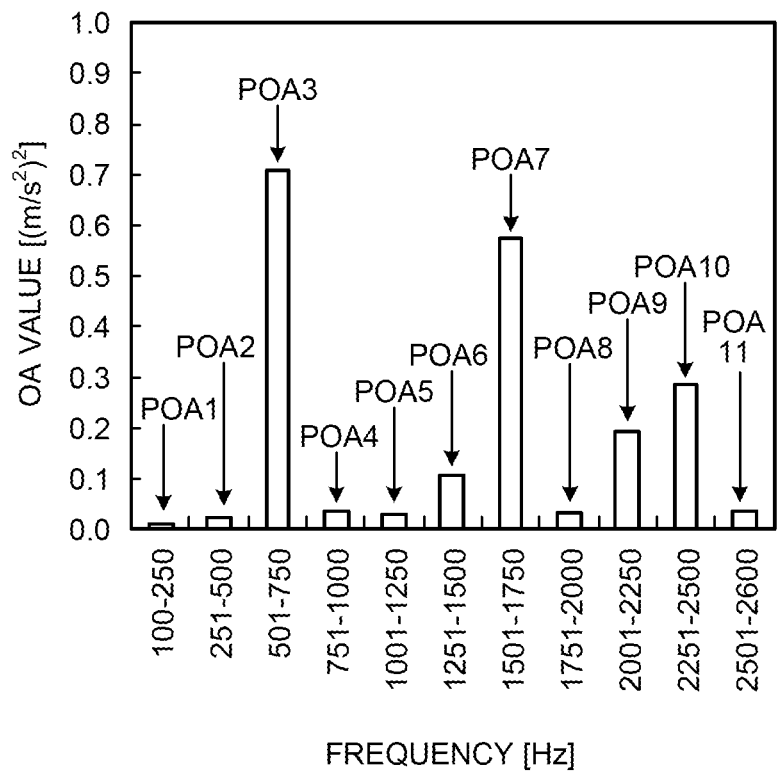

FIGS. 4A and 4B are graphs each illustrating detection data of the vibration sensor 6 according to the embodiment. FIGS. 5A and 5B are graphs each illustrating partial overall values according to the embodiment.

In the examples illustrated in FIGS. 4A and 4B and FIGS. 5A and 5B, the machine B on which the detection device 1 is installed is a motor that is a kind of the rotary machine. The motor operates the pump. FIG. 4A illustrates detection data of the vibration sensor 6 when a bearing of the motor is in a normal state. FIG. 4B illustrates detection data of the vibration sensor 6 when the bearing of the motor is in an abnormal state. FIG. 4A illustrates the detection data when the bearing is not damaged, and FIG. 4B illustrates the detection data when the bearing is artificially damaged. FIG. 5A illustrates the partial overall values calculated on the basis of the detection data illustrated in FIG. 4A. FIG. 5B illustrates the partial overall values calculated on the basis of the detection data illustrated in FIG. 4B.

In each of FIGS. 4A and 4B, the vertical axis represents power spectral density $[(m/s^2)^2/Hz]$ of the machine B detected by the vibration sensor 6, and the horizontal axis represents frequency [Hz]. In each of FIGS. 5A and 5B, the vertical axis represents overall value $[(m/s^2)^2]$, and the horizontal axis represents frequency ranges divided to calculate the partial overall values.

In the embodiment, the vibration sensor 6 is configured to detect a vibration waveform. The overall value is the sum of power spectra (power spectral density) obtained as a result of the FFT analysis, over the entire range. The partial overall value represents an overall value in a limited frequency range for which the sum of power spectra (power spectral density) is to be calculated.

As illustrated in FIG. 4B, when the bearing is in the abnormal state, acceleration increases at a specific frequency.

As illustrated in FIGS. 5A and 5B, the calculation unit 82 divides the entire range of the frequencies (100 [Hz] or more and 2600 [Hz] or less) of a spectrum obtained by FFT analysis of the detection data of the vibration sensor 6, into a plurality of frequency ranges. In the embodiment, the calculation unit 82 divides the entire range of frequencies (100 [Hz] or more and 2600 [Hz] or less) detected by the vibration sensor 6, into a first frequency range to an eleventh frequency range. One frequency range is approximately 250 [Hz].

In the embodiment, the first frequency range is 100 [Hz] or more and 250 [Hz] or less. The second frequency range is 251 [Hz] or more and 500 [Hz] or less. The third frequency range is 501 [Hz] or more and 750 [Hz] or less. The fourth frequency range is 751 [Hz] or more and 1000 [Hz] or less. The fifth frequency range is 1001 [Hz] or more and 1250 [Hz] or less. The sixth frequency range is 1251 [Hz] or more and 1500 [Hz] or less. The seventh frequency range is 1501 [Hz] or more and 1750 [Hz] or less. The eighth frequency range is 1751 [Hz] or more and 2000 [Hz] or less. The ninth frequency range is 2001 [Hz] or more and 2250 [Hz] or less. The tenth frequency range is 2251 [Hz] or more and 2500 [Hz] or less. The eleventh frequency range is 2501 [Hz] or more and 2600 [Hz] or less.

The calculation unit 82 calculates a partial overall value for each of the plurality of frequency ranges. In other words, the calculation unit 82 calculates a first partial overall value POA1 for the first frequency range and calculates a second partial overall value POA2 for the second frequency range. Likewise, the calculation unit 82 calculates a third partial overall value POA3 to an eleventh partial overall value POA11 for each of the third frequency range to the eleventh frequency range. In this way, the calculation unit 82 calculates the partial overall values for all of the plurality of frequency ranges. The number of partial overall values calculated is the same as the number of divisions in the frequency range. In each of the examples illustrated in FIGS. 5A and 5B, the number of divisions in frequency is eleven. The calculation unit 82 calculates eleven partial overall values.

In each of the examples illustrated in FIGS. 5A and 5B, there is a plurality of frequencies at which the overall value is increased. The plurality of frequencies at which the overall value is increased has an integer multiple relationship.

Note that in each of the examples illustrated in FIGS. 5A and 5B, the entire range of the spectrum detected by the vibration sensor 6 and obtained by calculation is divided into eleven frequency ranges. The number of divisions in the frequency range is not limited to eleven. The number of divisions in the frequency range is preferably two or more. Furthermore, in each of the examples illustrated in FIGS. 5A and 5B, one frequency range is approximately 250 [Hz]. One frequency range is not limited to 250 [Hz]. The frequency range and the number of divisions are determined on the basis of the characteristics of the machine B. For example, in a case where the machine B is a gear that is a kind of the rotary machine, frequencies at which the overall value is increased can be almost identified on the basis of the number of teeth of or rotation speed of the gear in the abnormal state. In addition, a plurality of frequencies at which the overall value is increased has an integer multiple relationship. The calculation unit 82 is configured to set the frequency range and the number of divisions so that frequencies at which the overall value is increased are included in one frequency range, on the basis of the characteristics of the machine B that are known data.

Diagnosis Method

Figure 6:
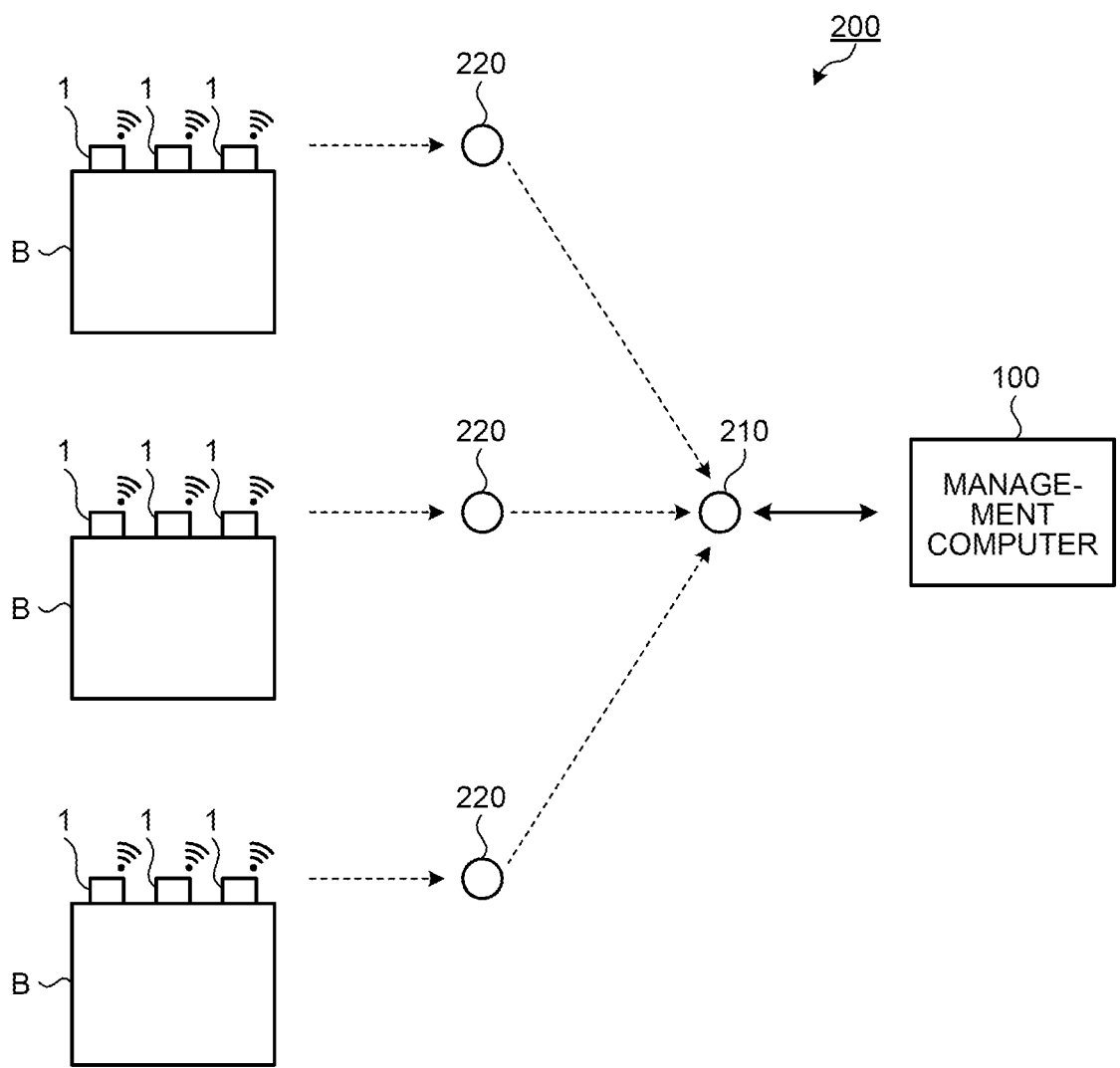
FIG. 6 is a diagram schematically illustrating the diagnostic system according to the embodiment.

FIG. 6 is a diagram schematically illustrating the diagnostic system 200 according to the embodiment. FIG. 7 is a flowchart illustrating a diagnosis method according to the embodiment.

As illustrated in FIG. 6, the diagnostic system 200 includes a plurality of detection devices 1 that is configured to be installed on the machine B. A plurality of machines B is provided in an industrial facility. In the example illustrated in FIG. 6, a plurality of detection devices 1 is installed on one machine B. As described above, as the machine B, the motor configured to operate a pump is exemplified. The machine B may be installed in the basement. When the machine B operates, the machine B generates heat. The machine B functions as a heat source for the thermoelectric generation module 5.

When the machine B operates and the machine B generates heat, a temperature difference is applied between the heat reception portion 2 and the heat release portion 3. The thermoelectric generation module 5 generates power due to the temperature difference between the heat reception portion 2 and the heat release portion 3. The power generated by the thermoelectric generation module 5 is stored in the power storage unit 15.

The power supply control unit 83 monitors the amount of power stored in the power storage unit 15. The power supply control unit 83 determines whether the amount of power stored in the power storage unit 15 is equal to or larger than the defined value (Step S1).

If it is determined in Step S1 that the amount of power stored in the power storage unit 15 is equal to or larger than the defined value (Step S1: Yes), the power supply control unit 83 controls the switching unit 14 to switch the power storage state to the power supply state. The power storage unit 15 discharges (Step S2).

The power supply control unit 83 controls the switching unit 14 to supply the power discharged from the power storage unit 15 to each of the vibration sensor 6, the microcomputer 8, and the wireless communication device 9. Each of the vibration sensor 6, the microcomputer 8, and the wireless communication device 9 is driven by the power supplied from the power storage unit 15.

The vibration sensor 6 detects the vibration of the machine B. The sensor data acquisition unit 81 acquires detection data of the vibration sensor 6 (Step S3).

The calculation unit 82 performs FFT analysis on the detection data of the vibration sensor 6 acquired by the sensor data acquisition unit 81 (Step S4).

The calculation unit 82 divides the entire range of the frequencies of a spectrum obtained in Step S4 into a plurality of frequency ranges. As described with reference to FIGS. 5A and 5B, in the embodiment, the calculation unit 82 divides the entire range of the frequencies of the spectrum obtained in Step S4 into eleven frequency ranges. The calculation unit 82 calculates a partial overall value for each of the plurality of frequency ranges. In other words, the calculation unit 82 calculates the first partial overall value POA1 for the first frequency range to the eleventh partial POA1 for the eleventh frequency range (Step S5).

The communication control unit 84 causes the wireless communication device 9 to transmit the plurality of partial overall values (the first partial overall value POA1 to the eleventh partial overall value POA11) calculated in Step S5. The wireless communication device 9 transmits the plurality of partial overall values to the management computer 100 (Step S6).

As illustrated in FIG. 6, the diagnostic system 200 includes a communication device 210 and a plurality of repeaters 220.

Each of the repeaters 220 connects between the detection device 1 and the communication device 210. Each repeater 220 communicates with the communication device 210 in a wireless manner. Partial overall values from the wireless communication device 9 are transmitted to the communication device 210 via the repeater 220. Partial overall values are transmitted to the communication device 210 from each of the plurality of detection devices 1.

The communication device 210 receives partial overall values transmitted from each of the plurality of detection devices 1 via the repeater 220 and transmits the partial overall values to the management computer 100. The communication device 210 processes the partial overall values transmitted from each of the plurality of detection devices 1 into a predetermined format, and then transmits the partial overall values to the management computer 100. The partial overall values from each of the plurality of detection devices 1 are aggregated by the communication device 210 and then transmitted to the management computer 100. The communication device 210 and the management computer 100 may communicate with each other in a wireless manner or a wired manner.

The management computer 100 is configured to monitor and manage the state of a plurality of machines B on the basis of the partial overall values transmitted from the plurality of detection devices 1. The management computer 100 is configured to diagnose the presence or absence of an abnormality in each of the machines B, on the basis of the partial overall values transmitted from each of the plurality of detection devices 1.

In the embodiment, the plurality of detection devices 1 is configured to transmit the partial overall values independently. In other words, each detection device 1 is configured to transmit the partial overall values without being affected by the other detection devices 1.

For example, when the machine B and the detection devices 1 are located in the basement and the communication device 210 and the management computer 100 are located on the ground, the partial overall values transmitted from the detection devices 1 are smoothly transmitted to the management computer 100 due to providing the repeaters 220.

If it is determined in Step S1 that the amount of power stored in the power storage unit 15 is not equal to or larger than the defined value (Step S1: No), the power supply control unit 83 controls the switching unit 14 to continue the power storage state. The power storage unit 15 stores power (Step S7).

In the embodiment, power is supplied to each of the vibration sensor 6, the microcomputer 8, and the wireless communication device 9 intermittently. When the amount of power stored in the power storage unit 15 is equal to or larger than the defined value, the wireless communication device 9 transmits the partial overall values.

The larger a temperature difference between the heat reception portion 2 and the heat release portion 3, the larger power generated by the thermoelectric generation module 5. In other words, with increasing temperature difference between the heat reception portion 2 and the heat release portion 3, a shorter time is required to store the power generated by the thermoelectric generation module 5 in the power storage unit 15. Therefore, with increasing temperature difference between the heat reception portion 2 and the heat release portion 3, a cycle of transmitting the partial overall values by the wireless communication device 9 is reduced. When an abnormality occurs in the machine B, the amount of heat generated by the machine B is likely to increase. In other words, when the abnormality occurs in the machine B, there is a high possibility that a temperature difference between the heat reception portion 2 and the heat release portion 3 is increased. Therefore, when the abnormality occurs in the machine B, the cycle of transmitting the partial overall values by the wireless communication device 9 is reduced. When the abnormality occurs in the machine B, the amount of data of the partial overall values transmitted from the detection device 1 to the management computer 100 increases, and thus, the management computer 100 efficiently analyzes whether the abnormality has occurred in the machine B.

Effects

As described above, according to the embodiments, the vibration sensor 6 is installed on the machine B. The detection data of the vibration sensor 6 is output to the microcomputer 8. The calculation unit 82 of the microcomputer 8 performs FFT analysis on the detection data of the vibration sensor 6, divides a specific range of the frequencies of a spectrum obtained by the FFT analysis into a plurality of frequency ranges, and calculates a partial overall value for each of the plurality of frequency ranges. The partial overall value is calculated not for some of the frequency ranges detected by the vibration sensor 6 but for all of the plurality of frequency ranges. A plurality of partial overall values calculated by the calculation unit 82 is transmitted from the wireless communication device 9 to the management computer 100. Therefore, the management computer 100 is allowed to properly diagnose the machine B on the basis of the plurality of partial overall values.

The wireless communication device 9 transmits the partial overall values calculated by the calculation unit 82. The amount of data of the partial overall values is smaller than the amount of data of the detection data acquired by the sensor data acquisition unit 81. Therefore, for example, regardless of insufficient data communication capability of the communication line, the wireless communication device 9 is allowed to smoothly transmit, to the management computer 100, the partial overall values having a smaller amount of data.

In the embodiments, the calculation unit 82 is configured to calculate an overall value of a vibration waveform detected by the vibration sensor 6. The overall value calculated by the calculation unit 82 is transmitted from the wireless communication device 9 to the management computer 100, and thereby the management computer 100 is allowed to diagnose the machine B more properly on the basis of a plurality of partial overall values and the overall value.

In the embodiments, the calculation unit 82 is configured to calculate an effective value or peak value of the detection data of the vibration sensor 6. The effective value or peak value calculated by the calculation unit 82 is transmitted from the wireless communication device 9 to the management computer 100, and thereby the management computer 100 is allowed to diagnose the machine B more properly on the basis of a plurality of partial overall values, effective values, or peak values.

In the embodiments, the detection device 1 includes the thermoelectric generation module 5 that functions as power supply for the vibration sensor 6, the microcomputer 8, and the wireless communication device 9. The thermoelectric generation module 5 is configured to generate power due to a temperature difference between the heat reception portion 2 and the heat release portion 3. The vibration sensor 6 is driven by power generated by the thermoelectric generation module 5. The wireless communication device 9 is driven by the power generated by the thermoelectric generation module 5 and transmits the partial overall values. Thus, the vibration sensor 6 and the wireless communication device 9 are driven without using a cable connecting the vibration sensor 6 to a battery or a commercial power source. Only installation of the detection device 1 on the machine B enables transmission of the partial overall values to the management computer 100. The management computer 100 is allowed to efficiently diagnose the presence or absence of an abnormality in the machine B on the basis of the partial overall values. Even when a plurality of machines B is in an industrial facility, only installation of the detection device 1 on each of the plurality of machines B enables the management computer 100 to efficiently diagnose the presence or absence of an abnormality for each of the plurality of machines B.

The thermoelectric generation module 5, the vibration sensor 6, the microcomputer 8, and the wireless communication device 9 are housed in one housing 20. This, for example, makes it possible to reduce the influence of noise on the detection data of the vibration sensor 6.

The diagnostic system 200 includes the plurality of detection devices 1 configured to be installed on each of the plurality of machines B, and the communication device 210 configured to receive partial overall values transmitted from each of the plurality of detection devices 1 and transmit the partial overall values to the management computer 100. Therefore, the management computer 100 is allowed to monitor and manage the state of the plurality of machines B and diagnose the presence or absence of an abnormality in the plurality of machines B. In addition, the thermoelectric generation module 5 functions as the power supply and the wireless communication device 9 transmits the partial overall values in a wireless manner, and thereby, for example, only installation of the detection device 1 on the machine B without arranging a cable in an industrial facility facilitates collection of the partial overall values.

Other Embodiments

Note that in the embodiments described above, the management computer 100 may include one computer or a plurality of computers.

In the embodiments described above, one housing 20 houses the thermoelectric generation module 5, the vibration sensor 6, the microcomputer 8, and the wireless communication device 9. The thermoelectric generation module 5 may be housed in a first housing, and the vibration sensor 6, the microcomputer 8, and the wireless communication device 9 may be housed in a second housing. The first housing and the second housing are separate housings. The power storage unit 15 may be arranged between the first housing and the second housing.

In the embodiments described above, the function of the calculation unit 82 may be provided in the management computer 100. The detection data of the vibration sensor 6 may be transmitted to the management computer 100 via the wireless communication device 9 so that the management computer 100 may calculate the partial overall values. Furthermore, the function of the management computer 100 may be provided in the microcomputer 8. For example, the calculation unit 82 may diagnose the presence or absence of an abnormality.

According to the present disclosure, the device can be properly diagnosed.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A detection device comprising:
    a vibration sensor configured to detect vibration of a machine;
    a calculation unit configured to:
        perform a Fast Fourier Transform (FFT) analysis on detection data of the vibration sensor to thereby obtain a power spectral density of the machine detected by the vibration sensor in a frequency range,
        divide the frequency range of the FFT into a plurality of frequency ranges, and
        calculate a partial overall value for each of the plurality of frequency ranges, each of the partial overall values representing a sum of the power spectral density within one of the plurality of frequency ranges; and
    a wireless communication device configured to transmit the partial overall values.

2. The detection device according to claim 1, wherein:
    the calculation unit is further configured to calculate an overall value, an effective value, or a peak value of the detection data; and p1 the wireless communication device is further configured to transmit the overall value, the effective value, or the peak value.

3. The detection device according to claim 1, further comprising:
    a thermoelectric generation module,
    wherein the vibration sensor is configured to be driven by power generated by the thermoelectric generation module.

4. The detection device according to claim 3, wherein the thermoelectric generation module, the vibration sensor, and the wireless communication device are housed in a single housing.

5. A diagnostic system comprising:
    the detection device according to claim 1; and
    a management computer configured to receive the partial overall values transmitted from the detection device and to diagnose the machine based on the received partial overall values.

6. The detection device according to claim 1, wherein a number of the partial overall values is equal to a number of the plurality of frequency ranges.

7. The detection device according to claim 2, wherein the overall value represents a sum of the power spectral density in the frequency range of the FFT.

8. The detection device according to claim 1, wherein the partial overall values are in a unit of $(m/s^2)^2$.

9. The detection device according to claim 1, wherein one or more of the plurality of frequency ranges span a predetermined frequency range.

10. The detection device according to claim 9, wherein the predetermined frequency range is 250 Hz.

11. The detection device according to claim 9, wherein at least one of the plurality of frequency ranges spans less than the predetermined frequency range.

12. The detection device according to claim 9, wherein at least one of the plurality of frequency ranges spans greater than the predetermined frequency range.

13. The detection device according to claim 1, wherein the wireless communication device is configured to transmit all of the partial overall values corresponding to all of the plurality of frequency ranges, respectively.

14. A detection device comprising:
    a thermoelectric generation module;
    a vibration sensor configured to be driven by power generated by the thermoelectric generation module and configured to detect vibration of a machine;
    a calculation unit configured to perform a Fast Fourier Transform (FFT) analysis on detection data of the vibration sensor, divide a specific frequency range into a plurality of frequency ranges, and calculate a partial overall value for each of the plurality of frequency ranges; and
    a wireless communication device configured to transmit the partial overall value.

15. The detection device according to claim 14, wherein the thermoelectric generation module, the vibration sensor, and the wireless communication device are housed in a single housing.

* * * * *